G. M. HOLMES.
BERRY PICKER.
APPLICATION FILED SEPT. 24, 1908.
924,552.
Patented June 8, 1909.
3 SHEETS—SHEET 1.
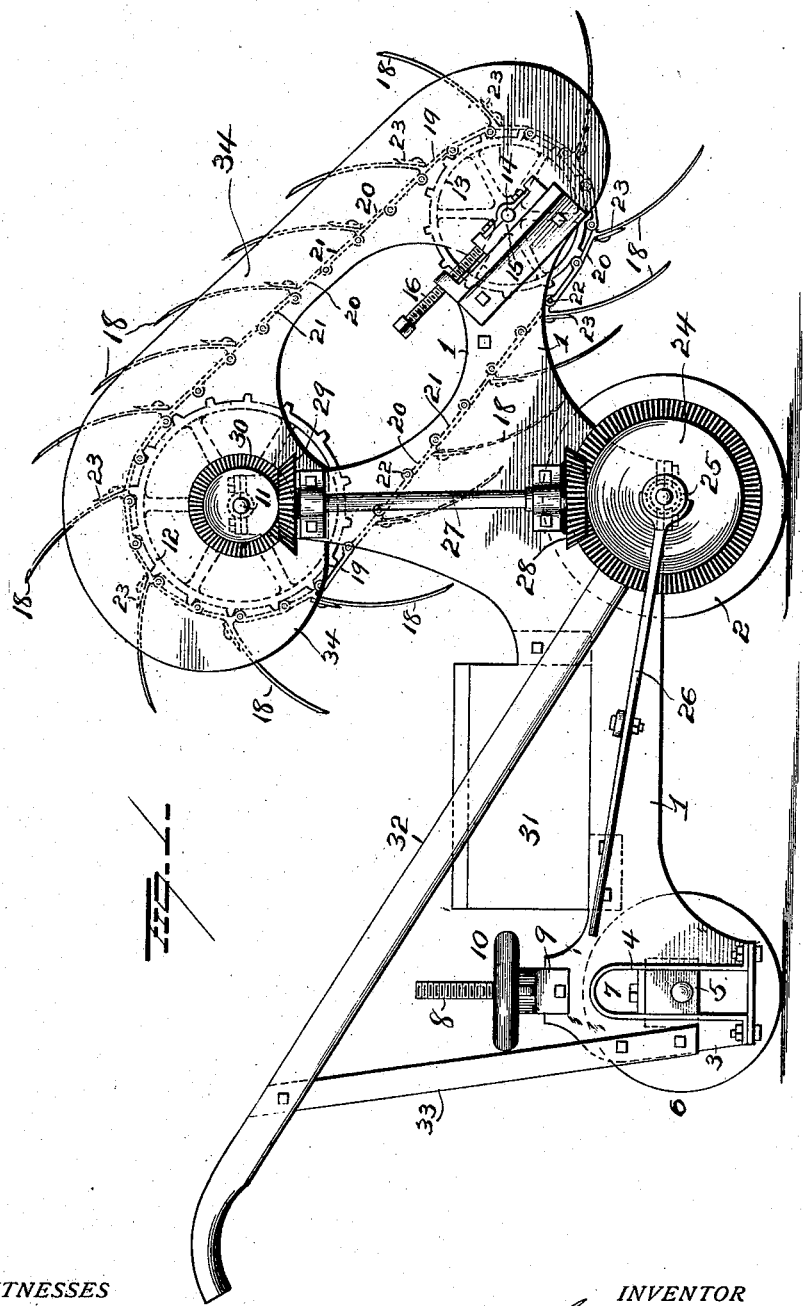
WITNESSES
INVENTOR

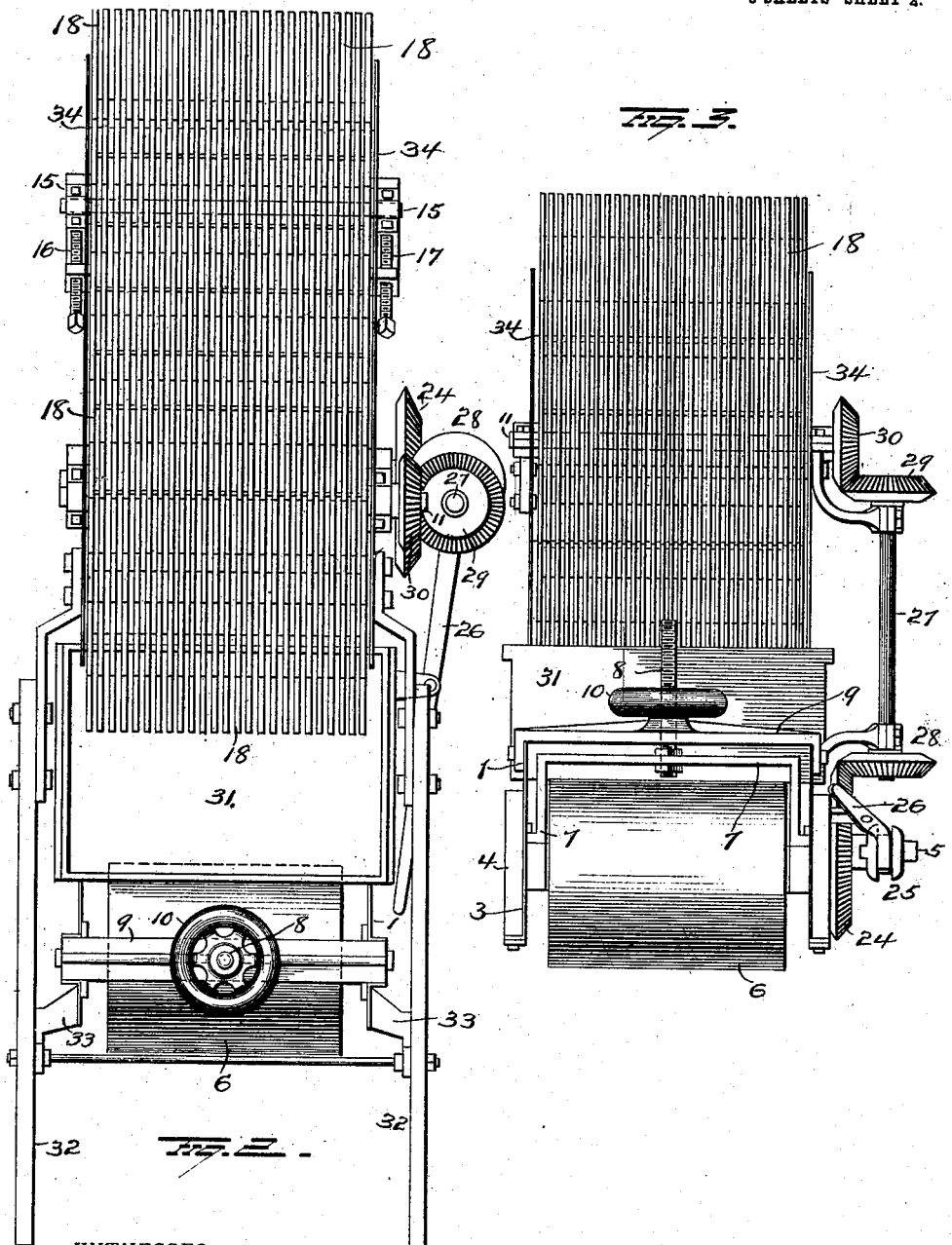

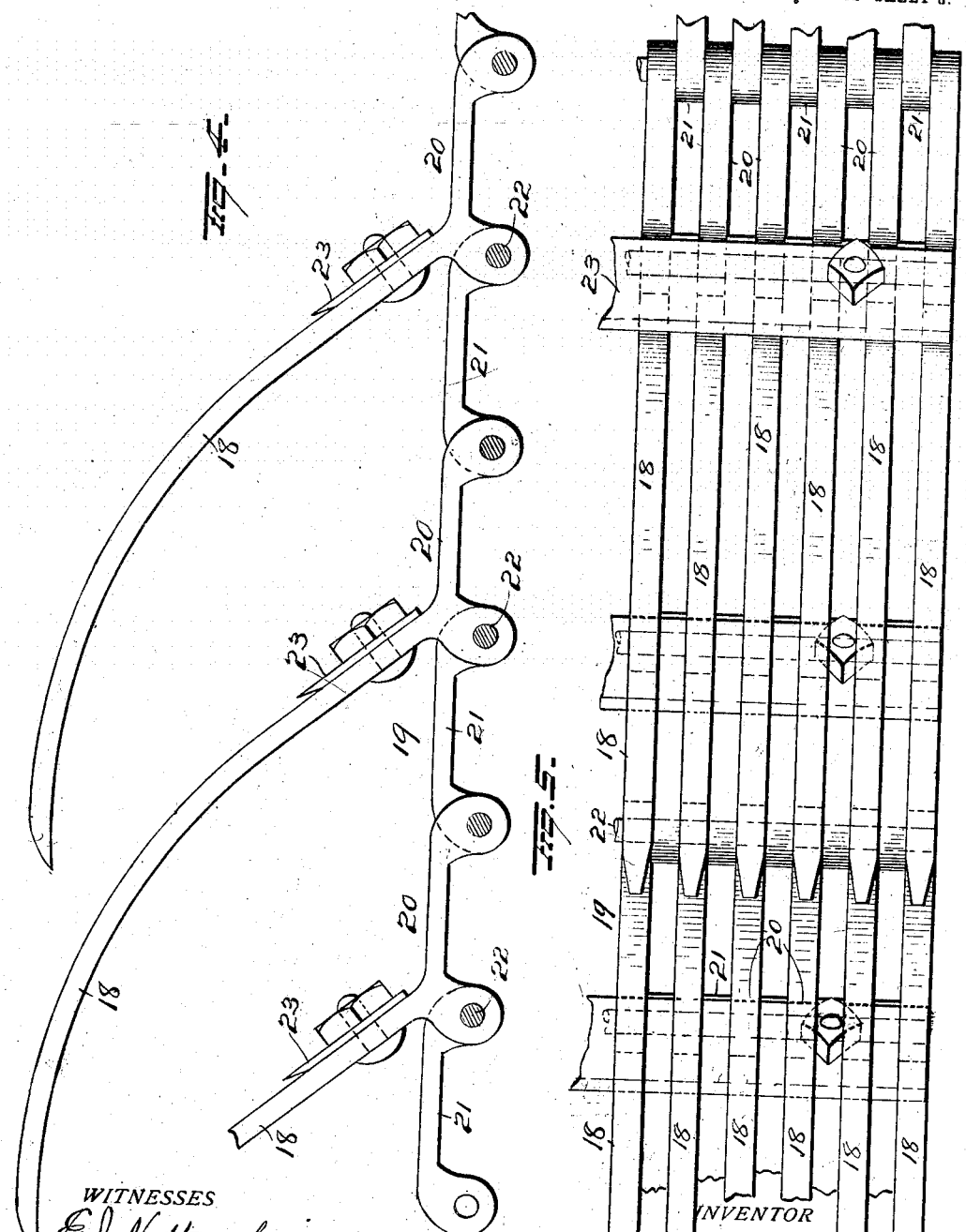

UNITED STATES PATENT OFFICE.

GEORGE M. HOLMES, OF KINGSTON, MASSACHUSETTS, ASSIGNOR TO LIZZIE E. HOLMES, OF BRYANTVILLE, MASSACHUSETTS.

BERRY-PICKER.

No. 924,552.  Specification of Letters Patent.  Patented June 8, 1909.

Application filed September 24, 1908. Serial No. 454,564.

*To all whom it may concern:*

Be it known that I, GEORGE M. HOLMES, of Kingston, in the county of Plymouth and State of Massachusetts, have invented certain new and useful Improvements in Berry-Pickers; and I do hereby declare the following to be a full, clear, and exact description of the invention, such as will enable others skilled in the art to which it appertains to make and use the same.

This invention relates to an improvement in berry pickers, and more particularly to such as are adaptable for use in gathering cranberries,—one object of the invention being to so construct a machine of the character specified, that the "dip" of the gathering fingers or tines into the bog can be regulated and controlled and thus enhance the efficiency of the machine in gathering berries.

A further object is to provide a machine which will operate not only to gather the berries, but also to cut and remove useless "runners" or long vines, so as to prevent interference of the same with the proper operation of the gathering mechanism, and so as to avoid the undue destruction of the berry-bearing branches or the shaking off of berries which might occur if the picking devices should become entangled with such "runners".

With these objects in view the invention consists in certain novel features of construction and combinations of parts as hereinafter set forth and pointed out in the claims.

In the accompanying drawings, Figure 1 is a side elevation of a berry picking machine embodying my invention. Fig. 2 is a plan view. Fig. 3 is a rear view with the handles removed, and Figs. 4 and 5 are detail views, on an enlarged scale, showing the picking devices and the "runner" cutters.

1 represents a frame mounted upon the journals of a roller 2. The frame 1 is made with a rearwardly projecting portion 3 having vertical slots 4 in which the bearing boxes 5 for the journals of a roller 6, are mounted. A yoke 7 is attached at its ends to the bearing boxes 5 and to an intermediate part of this yoke, the lower end of a screw 8 is secured. The screw 8 passes freely through a hole in a cross-head 9 secured to the rear portion of the frame 1 over the roller 6 and on this screw, a hand wheel 10 is located. By means of these devices the bearing boxes 5 can be vertically adjusted so as to effect a tilting of the frame on its bearings on the journals of the roller 2 and thus adjust the forward end of the machine vertically for a purpose which will be hereinafter explained.

A horizontal shaft 11 is mounted in suitable bearings at the top of the framework 1 and to this shaft two sprocket wheels 12 are secured in proximity to its respective ends, for the accommodation of picking devices,— the latter also passing over sprocket wheels 13 secured to a shaft 14. The shaft 14 is mounted in bearing boxes 15 at the forward end of the framework and these bearing boxes are adjustable by means of screws 16—17 for the purpose of maintaining the picking mechanism taut.

The picking mechanism comprises numerous fingers or tines 18 arranged in groups to form a series of scoops and are carried by means of chains, two of which pass over the sprocket wheels 12 and 13. Each chain 19 of the picking mechanism comprises links 20 and 21, the former being made integral with the bases of the fingers or tines and made to alternate with the links 21. The several chains are located side by side and caused to travel together by means of cross-rods 22. The width of the picking mechanism is determined by the number of chains employed and the spacing apart of the fingers of the various groups by the alternate links 21 of the chains 19. In order to afford means for cutting the "runners" in the bog and preventing the latter from being torn and the berries shaken off, knives 23 are secured in proximity to the bases of each group of fingers, as clearly shown in Fig. 4.

A beveled gear 24 is mounted loosely on a journal of the roller 2 and is adapted to be connected with the latter by means of a clutch 25. A lever 26 is provided for operating this clutch. A vertical shaft 27 is mounted in suitable bearings on the frame 1 and carries at its lower end a beveled gear 28 which receives motion from the beveled gear 24. A bevel gear 29 is secured to the upper end of the vertical shaft 27 and transmits motion to a similar gear 30 secured to the shaft 11 which carries the sprocket wheels 12. By means of the gearing above described, motion will be transmitted to the picking mechanism and the latter caused to travel continuously after the manner of an endless drive chain. In order that the picking mechanism shall be driven at a proper speed, the ratio of the gears 24 and 28 will preferably be 2 to 1, although this ratio may be varied more or less. A box or crate 31 is mounted on the frame in rear of the picking mechanism so as to receive berries from the latter.

Handles 32 are secured to the framework and suitably braced by means of bars 33.

In order to prevent the berries from escaping laterally from the picking mechanism, suitable guards 34 are provided at each side of the latter.

In operating the machine by pushing it forwardly, the traction or driving roller 2 will impart motion, through the gearing above described, to the sprocket wheels 12 and thereby cause the scoops formed by the groups of fingers or tines 18 to advance into the vines and the percentage of this advance to that of the machine is regulated by the ratio of velocity between the roller 2 and the sprockets 12.

In machines for gathering cranberries as heretofore constructed, it has been difficult to gage the depth of "dip" of the scoop into the vines; the result being a loss of berries when the "dip" is not deep enough, or a tearing up of the plants or vines when the "dip" is too deep. These defects are cured in my machine by the manipulation of the adjustable roller 6 so as to raise or lower the rear end of the machine and cause it to tilt on the journals of the roller 2 as a fulcrum and thereby raise or lower the picking mechanism at the forward end of the frame and cause the picking fingers to "dip" more or less deeply into the plants or vines. When the machine has been adjusted so that the proper "dip" of the picking mechanism will be effected, this adjustment can be maintained or it can be readily changed as the case may require.

It is well known that on all bogs, many long useless vines are present and are liable to be engaged by picking mechanism as heretofore constructed and the berry bearing branches torn and shaken so as to destroy them and shake off the berries. These useless vines or "runners" are also apt to interfere with the proper operation of the machine. With my machine however, the said vines or "runners" will be cut by the knives 23 and when thus severed they will be carried up with the berries and deposited in the box or crate 31 by the scoops or groups of picking fingers. It will be observed that the groups of fingers forming the scoops rise so high as they come out from the vines, that the bearing vines cannot be injured by the knives, as only the "runners" are long enough to be reached by said knives.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is,—

1. In a machine of the character described, the combination with a traveling frame, two series of sprocket wheels mounted thereon, chains driven by said sprocket wheels, picking fingers made integral with alternate links of the respective chains, said picking fingers arranged in groups in the form of scoops, and means for driving said sprocket wheels.

2. In a machine of the character described, the combination with a traveling frame and two series of sprocket wheels thereon, of chains to be driven by said sprocket wheels, means for driving said sprocket wheels, picking fingers carried by the chains, said picking fingers arranged in groups, and knives secured to the groups of picking fingers in proximity to the base portions thereof.

3. In a machine of the character described, the combination with a traveling frame and two sets of sprocket wheels mounted thereon, of a series of endless chains to be driven by said sprocket wheels, a series of fingers carried by said chains and the alternate links of each chain each constituting an integral extension from one of said fingers, and driving mechanism.

4. In a machine of the character described, the combination with a traveling frame and two sets of sprocket wheels mounted thereon, and a series of endless chains driven by said sprocket wheels, of a series of picking fingers projecting from links of each chain and the picking fingers of the several chains arranged in groups forming scoops, and guards at respective sides of the series of sprocket wheels and chains and the groups of picking fingers.

5. In a machine of the character described, the combination with a frame, a roller on which said frame is mounted, sprocket wheels mounted in the upper portion of said frame, and sprocket wheels mounted in the forward portion of said frame, of endless sprocket chains, picking fingers projecting from links of said chains, a vertical shaft mounted on the frame, gearing between said shaft and a journal of said roller, gearing between said vertical shaft and the shaft of the sprocket wheels at the upper portion of the frame, and a clutch for throwing said gearing into and out of operation.

In testimony whereof, I have signed this specification in the presence of two subscribing witnesses.

GEORGE M. HOLMES.

Witnesses:
FRANCIS J. HEAVENS,
GEO. H. HOLMES.